W. W. DEAN.
MAGNETO.
APPLICATION FILED AUG. 22, 1916.
1,271,441.
Patented July 2, 1918.
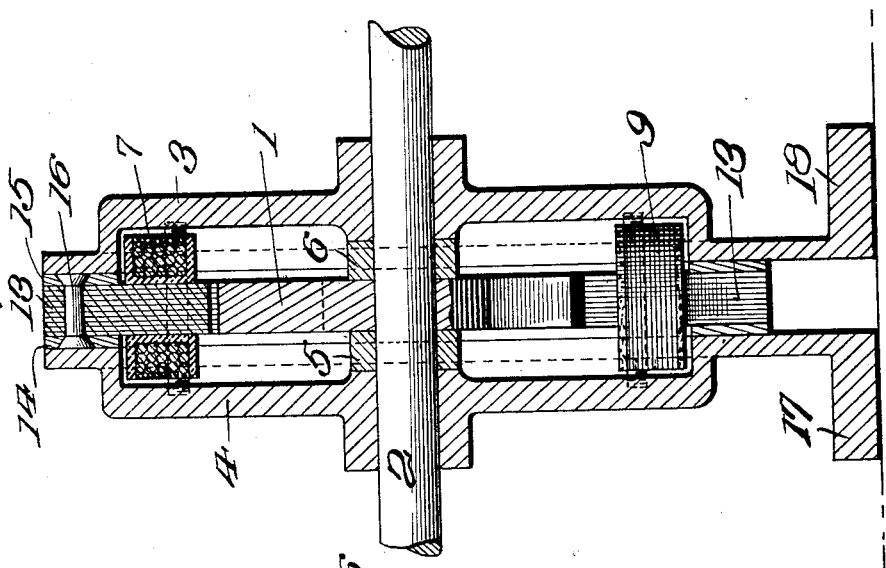
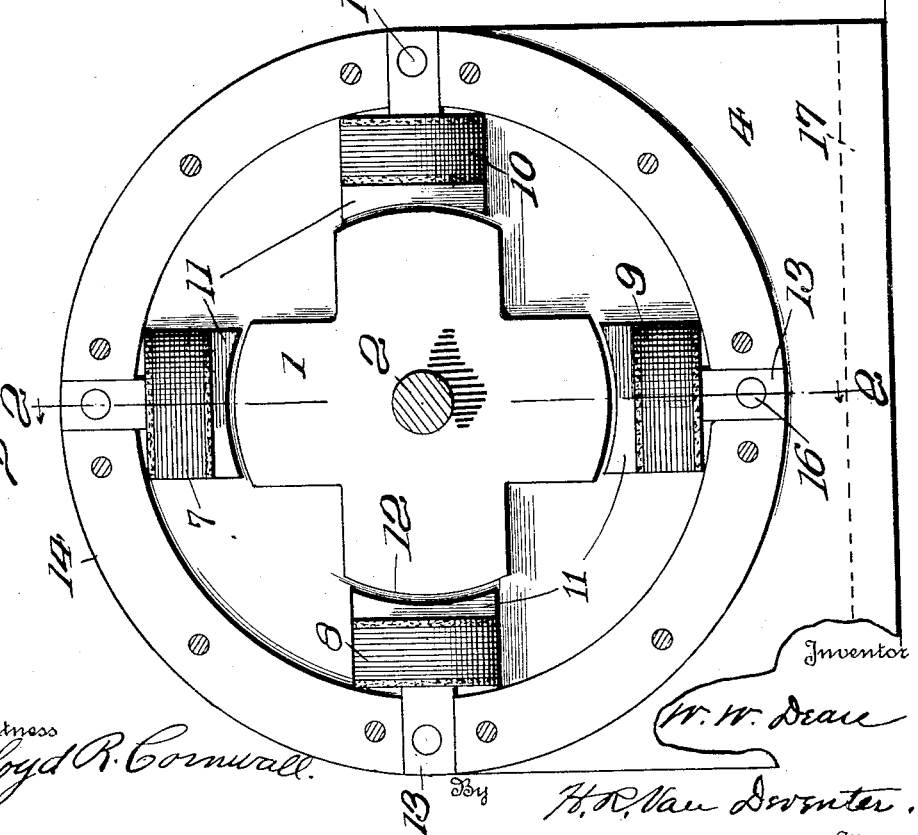

UNITED STATES PATENT OFFICE.

WILLIAM WARREN DEAN, OF STAMFORD, CONNECTICUT, ASSIGNOR TO SPLITDORF ELECTRICAL COMPANY, OF NEWARK, NEW JERSEY, A CORPORATION OF NEW JERSEY.

MAGNETO.

1,271,441.  Specification of Letters Patent.  Patented July 2, 1918.

Application filed August 22, 1916. Serial No. 116,360.

*To all whom it may concern:*

Be it known that I, WILLIAM W. DEAN, a citizen of the United States, residing at Stamford, in the county of Fairfield and State of Connecticut, have invented certain new and useful Improvements in Magnetos, of which the following is a specification, reference being had to the accompanying drawing.

The invention relates to new and useful improvements in generators for ignition purposes, more commonly termed magnetos; although the generator may be used for lighting as well as for ignition.

An object of the invention is to provide a magneto wherein the rotor is in the form of a permanent magnet having a plurality of poles and associated with said rotor is a plurality of current generating coils which are adapted to simultaneously receive flux from the poles of the rotating magnet forming the rotor.

A further object of the invention is to provide a magneto of the above type wherein the cores of the coils carrying the pole pieces receive flux from the magnet and wherein the cores of the several coils are connected together.

These and other objects will in part be obvious and will in part be hereinafter more fully disclosed.

In the drawings, which show by way of illustration, one embodiment of the invention;

Figure 1 is a vertical sectional view at right angles to the axis of the rotor showing a magneto having my improvements; and Fig. 2 is a sectional view on line 2—2 of Fig. 1.

The invention consists broadly of a magneto having a rotor in the form of a permanent magnet, which permanent magnet is provided with a plurality of like poles. The adjacent poles are N and S poles. Associated with the rotor is a series of separate current generating coils preferably the same in number as the poles of the magnet. These coils are disposed outside the magnet. Each core is provided with a coil which carries a pole piece adapted to receive flux from the poles of the magnet. The cores of the several coils are magnetically connected and this connection forms a continuous magnetic circuit between the coils.

Referring more in detail to the drawings, my improved magneto consists of a rotating magnet, 1, which is fixed to a shaft 2. The shaft is supported in suitable bearings in the plates 3 and 4 and the magnet is properly spaced or set on the shaft by means of collars 5 and 6. Located about the rotating magnet are spaced coils 7, 8, 9 and 10. Each coil is provided with a laminated core and these cores are extended to form pole pieces 11, there being one pole piece for each coil. The pole pieces 11 are somewhat less in width than the face 12 of the pole of the magnet furnishing flux thereto. One of the laminated cores is indicated at 13 of the drawings. These cores are riveted to magnetic plates 14 and 15 by suitable rivets 16. These magnetic plates 14 and 15 connect all the cores and form a continuous magnetic circuit between the coils. If desired the coil cores and the plates 14 and 15 may all be formed of laminations, that is the entire field carrying the coils may be integral.

The plates 3 and 4 in addition to forming bearing supports for the shaft 2 have feet 17 and 18 forming the base of the machine.

From the above it will be apparent that I have provided a magneto wherein the rotor is in the form of a permanent magnet and the current generating coils are disposed about the magnet. Associated with each coil is a core having a pole piece adapted to receive flux from the magnet. These cores are all connected, thus forming a continuous magnetic circuit between the coils.

It is obvious that certain of the coils may be used for ignition purposes while others are used for lighting.

It is also obvious that minor changes in the details of construction may be made without departing from the spirit of the invention as set forth in the appended claim.

Having thus described my invention what I claim as new and desire to secure by Letters Patent, is:—

A magneto comprising supporting non-magnetic side plates, a shaft carried by said plates, an integral rotating magnet mounted on said shaft and having a plurality of poles, collars on the shaft between the magnet and the side plates respectively for centering the magnet between the side plates, a plurality of current generating coils disposed outside of the path of travel of the magnet and between the side plates, a laminated core for each coil, said cores being disposed radially of the axis of the rotor and equal in number to the poles of the magnet, the inner ends of said cores being extended to form pole pieces adapted to receive flux from the poles of the magnet, the outer ends of said cores being clamped between the side plates and means for magnetically connecting said cores.

In testimony whereof I hereunto affix my signature in the presence of two witnesses.

WILLIAM WARREN DEAN.

Witnesses:
GEORGE R. CLOSE,
DOROTHY J. TILLEY.

Copies of this patent may be obtained for five cents each, by addressing the "Commissioner of Patents, Washington, D. C."